Patented Feb. 22, 1949

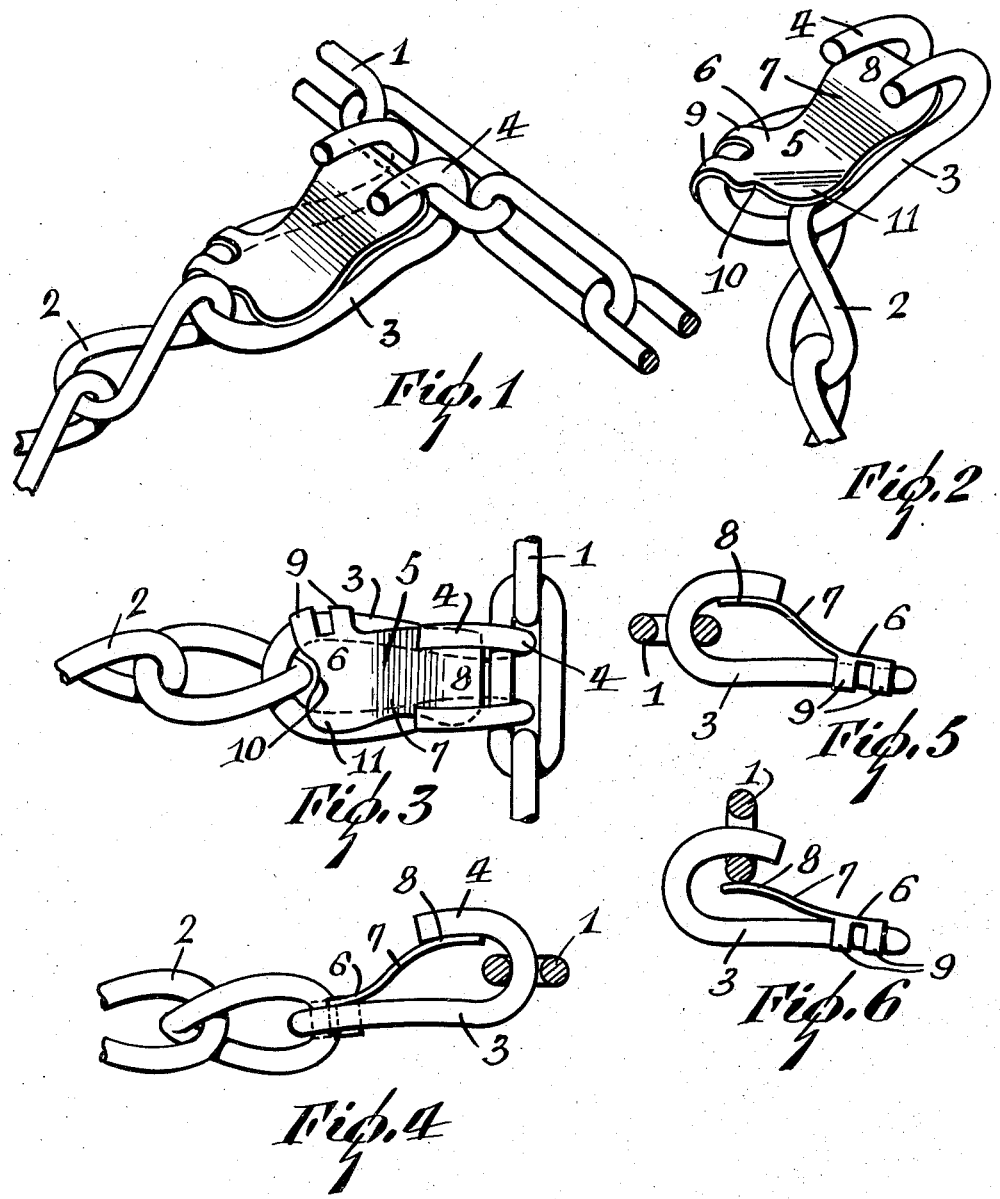

2,462,472

UNITED STATES PATENT OFFICE 2,462,472

TIRE CHAIN LATCH

Leopold Cuillierrier, Verdun, Quebec, Canada

Application March 29, 1946, Serial No. 658,066

2 Claims. (Cl. 152—241)

The present invention pertains to a novel latch for use in connection with chains used on the tires of motor vehicles.

Such chains are usually an assembly consisting of a circular chain at each side of the tire, these chains being joined by a suitable number of cross chains. In the running of the wheel, the cross chains frequently becomes detached from the side chains, especially if the tire becomes somewhat deflated.

The principal object of the invention is to provide a simple, economical and effective latch for the ends of the cross chains so that they cannot become detached from the side chains. Moreover, the latch is so constructed that the cross chains are locked in their hooks. Again, the construction of the latch is such that it enables the use of extremely simple and inexpensive end links for the cross chains. More particularly, each end link of the side chains is of a form of a substantially U-shaped member having its extremities formed as hooks that engage in one of the links of the adjacent side chain. The hooks would normally work loose from the side chain, and this is actually the case, unless a latching device is provided. The latch which constitutes the substance of the present invention is in the nature of a spring plate laid upon the body of the U-shaped link and bent so that it engages beneath the hooks. The plate thus cooperates with the hooks in forming an enclosure from which the engaged side chain link cannot normally be removed.

The plate is attached to the body of the U-shaped link by means of a hook or hooks formed integrally with the plate and encircling said body, preferably closely adjacent to the center of the arch of the body. Directly opposite the center of the arch, the plate is formed with a notch to accommodate the next link of the cross chain.

The latch is readily opened by pushing downwardly the free end of the plate out of contact with the hook ends of the U-shaped link. The said hooks can then be disengaged from the side chains. To disengage the side chains from the U-shaped links, the next link is moved out of its notch in raising the corner of the plate which is made of resilient metal.

The invention is fully disclosed by way of example in the following description and in the accompanying drawings in which:

Figure 1 is a perspective view showing the invention in use;

Figure 2 is a perspective view illustrating the method of releasing the latch;

Figure 3 is a plan view corresponding to Figure 1;

Figure 4 is a side elevation of the device, showing a link of the side chain in section;

Figure 5 is a similar elevation at the opposite side, and

Figure 6 is an elevation illustrating the release position of the latch.

Reference to these views will now be made by use of like characters which are employed to designate corresponding parts throughout.

In Figure 1 the numeral 1 illustrates one of the side chains of a tire chain assembly. It will be understood that the assembly consists of two side chains, one at each side of the tire, connected by a series of suitably spaced cross chains 2. The cross chains are normally hooked at their ends to the side chains. It is well known in practice that the cross chains frequently become detached in the running of the vehicle, especially if the tires become somewhat deflated.

The end links of the side chains are U-shaped members, one of which is designated by the numeral 3 in the several figures. The extremities of each end link are hooked at 4 to be passed through an adjacent link of the side chain 1, as clearly illustrated in Figures 1 and 3.

The invention provides means for preventing the end link from detaching itself from the side chain 1. This device consists essentially of a snap plate or latch plate 5 of resilient metal. One end 6 of the plate lies substantially in the plane of the body of the link 3, and the plate is bent at 7 so that its other end 8 is in a different plane and engages beneath the hooks 4, as shown in Figure 5. The portion 6 of the plate is formed at one edge with a pair of closely spaced hooks 9 adapted to encircle a side of the link 3 at a region spaced from but close to the center of the arch of the link. The adjacent end of the plate 5 is notched at 10 directly opposite the center of the arch for the purpose of accommodating the adjacent link of the chain 2, as may be seen in Figure 3. The plate 5, in the normal position shown in Figures 4 and 5, cooperates with the hooks 4 in forming an enclosure confining a side of the engaged link of the side chain 1, so that this link cannot work loose from the hooks 4.

At the side of the notch 10 opposite the hooks 9, the plate 5 is extended at 11 to overlie the adjacent side of the link 3, for a purpose that will presently appear.

In order to disengage the link 3 from the side chain 1, the portion of plate 5 is pushed downwardly and the engaged link of the side chain 1 can then be brought between the plate 5 and the hooks 4, as illustrated in Figure 6, and then readily separated from the hooks.

To disengage the cross chain 2 from the link 3, the said cross chain 2 is moved beneath a corner of the plate 5 opposite the hooks 9, as shown in Figure 2. This cross chain link is employed as a lever to tilt or pry the plate so that the link may be moved into the bight of hook 4 and be disengaged therefrom in the same manner as link 1.

However, in the running of the assembled chain on the tire, the plate 5 is an effective latch in preventing the links 3 in working loose from the side chains. It will be seen that the invention thus provides an extremely simple and inexpensive latch and at the same time enables the use of easily fabricated end links for the cross chains.

Although a specific embodiment of the invention has been illustrated and described, it will be understood that various alterations in the details of construction may be made without departing from the scope of the invention as indicated by the appended claims.

What I claim as my invention is:

1. In a tire chain assembly, a side chain of links and a cross chain of links, the end link of said cross chain being U-shaped and having its ends hooked for engagement in one of the side chain links, a bent plate of spring metal mounted on the body of said U-shaped link and engaging beneath the hooks thereof, means for fixing said plate to said body closely adjacent to the arch of said body and having a notch disposed directly opposite the center of said arch, said plate engaging said body in overlying and unattached relation at the side of said notch opposite the last named means.

2. In a tire chain assembly, a side chain of links and a cross chain of links, the end link of said cross chain being U-shaped and having its ends hooked for engagement in one of the side chain links, a bent plate of spring metal mounted on the body of said U-shaped link and engaging beneath the hooks thereof, a hook formed on said plate and encircling said body closely adjacent to the arch of said body, said plate having a notch disposed directly opposite the center of said arch, said plate engaging said body in overlying and unattached relation at the side of said notch opposite the last named hook.

LEOPOLD CUILLIERRIER.

REFERENCES CITED

The following references are of record in the file of this patent:

UNITED STATES PATENTS

| Number | Name | Date |
|---|---|---|
| 1,499,932 | Jacobson | July 1, 1924 |
| 1,978,758 | Perry | Oct. 30, 1934 |

FOREIGN PATENTS

| Number | Country | Date |
|---|---|---|
| 60,944 | Norway | June 5, 1939 |